United States Patent
Burger

[19]

[11] Patent Number: 5,927,918
[45] Date of Patent: Jul. 27, 1999

[54] TRAILER BALL FASTENING ASSEMBLY

[75] Inventor: Robert J. Burger, Clarkston, Mich.

[73] Assignee: Valley Industries

[21] Appl. No.: 08/772,019

[22] Filed: Dec. 19, 1996

Related U.S. Application Data

[60] Provisional application No. 60/009,350, Dec. 22, 1995.

[51] Int. Cl.[6] ............................. F16B 31/02; B60D 1/173
[52] U.S. Cl. ................................ 411/10; 411/14; 280/513
[58] Field of Search .................................. 411/9, 10, 11, 411/13, 14, 201, 515; 280/511, 512, 513

[56] References Cited

U.S. PATENT DOCUMENTS

| | | | |
|---|---|---|---|
| 2,377,368 | 6/1945 | Polstra | 280/513 |
| 4,008,906 | 2/1977 | Schafer et al. | 280/511 |
| 5,188,494 | 2/1993 | Hatin | 411/10 |
| 5,205,666 | 4/1993 | Hollis | 280/512 X |

OTHER PUBLICATIONS

Document 25455N, Injection Molding Resins, DOW HDPE, High Density Polyethylene Resin, Dow Plastics.

Product Description, MacDermid MACuGuard, Torque'n Tension Control Fluid, Produce Code No. 17130, MacDermid, Incorporated.

Smart Nut Installation Instructions, Valley Ind., Sep. 27, 1993.

*Primary Examiner*—Neill R. Wilson
*Attorney, Agent, or Firm*—Rader, Fishman & Grauer PLLC

[57] ABSTRACT

A method and apparatus for mounting a trailer ball to a mounting platform. The apparatus includes a trailer ball having a threaded stem, a flat washer, and a nut having a plastic collar. The plastic collar includes a ring which is disposed between the nut and flat washer. The ring is formed of a plastic material which is extruded when the nut is tightened sufficiently to provide a positive indication that sufficient tension has been placed on the joint. The method also includes lubricating the stem before threading the nut onto the stem and removing the extruded ring after tightening.

6 Claims, 1 Drawing Sheet

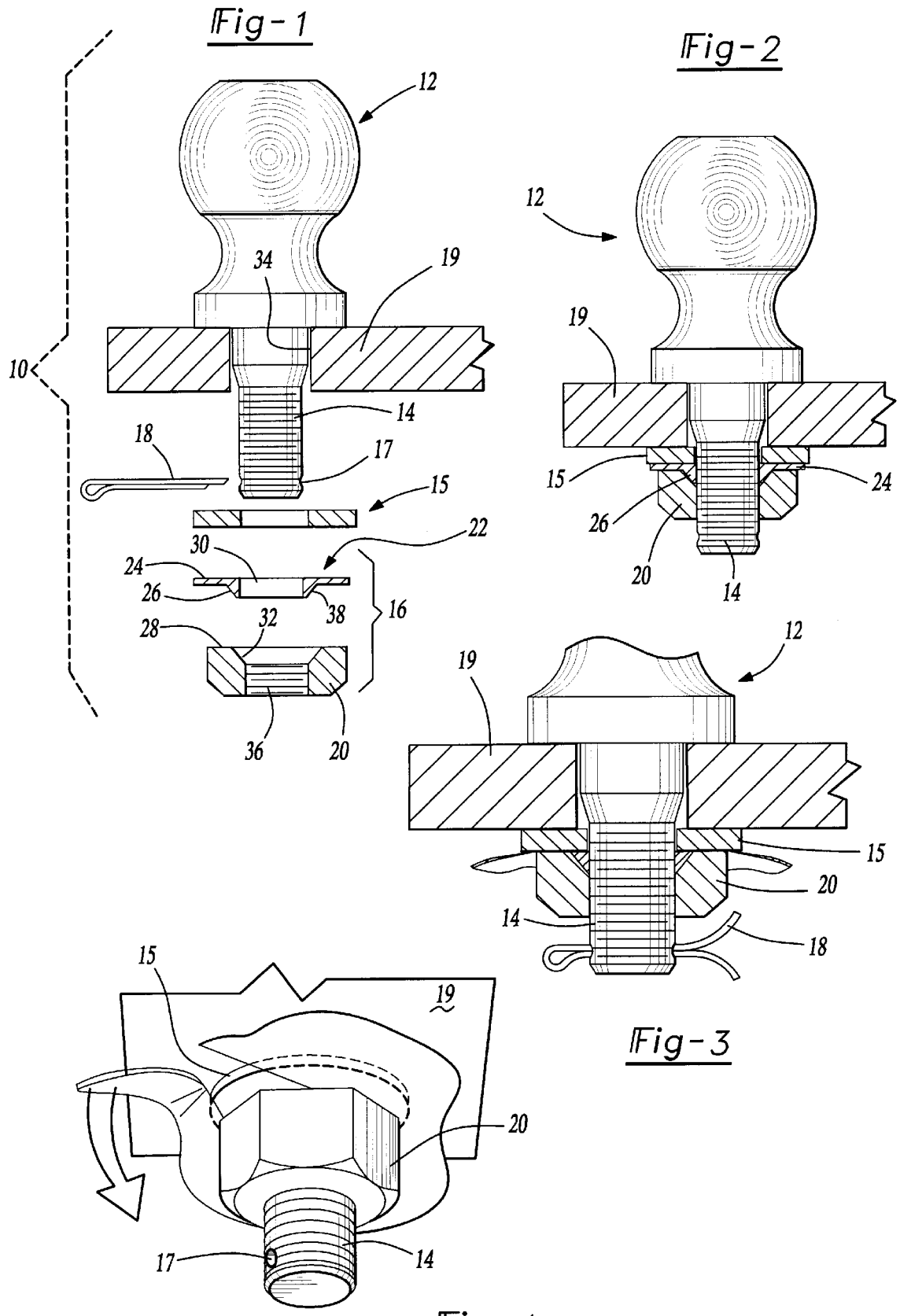

TRAILER BALL FASTENING ASSEMBLY

RELATED APPLICATION

This application takes priority from Provisional Application Ser. No. 60/009,350, filed Dec. 22, 1995.

BACKGROUND OF THE INVENTION

I. Field of the Invention

The invention relates to a trailer ball mounting assembly, and more particularly, to assemblies which are mounted and dismounted from trailer hitches to change the size of ball being used.

II. Description of the Prior Art

It is well known to mount a trailer ball to a trailer hitch by threading it onto a threaded stem of the trailer ball. Occasionally, in situations where the trailer ball is frequently changed, such as rental operations, insufficient torque is applied to the nut by the installer. When the nut is not tightened sufficiently, vibrations and jolts can cause the nut to back off the stem. In such cases the trailer ball, together with the trailer, can be jolted from the mounting platform causing the trailer to separate from the vehicle causing extensive damage to the trailer or other vehicles.

Accordingly, it is an object of this invention to provide a trailer ball fastening assembly and method of assembly which prevent inadvertent dismount of the trailer ball from the ball mounting platform.

SUMMARY OF THE INVENTION

The present invention provides a trailer ball mounting assembly and method of installation, including a trailer ball, flat washer, and a clampload indication nut. The trailer ball has a threaded stem having an aperture extending diametrically at a distal end of the stem for receiving a cotter pin and the tension-indicating nut. The nut has a plastic collar which has an annular ring portion positioned between an annular surface of the nut and the flat washer. When the nut is tightened sufficiently, the annular ring is extruded radially outwardly from between the nut and the washer to indicate that proper tension has been applied. The cotter pin is then inserted in the bore of the stem. The method includes lubricating the threads of the stem before threading the nut and removing the extruded ring after tightening.

DESCRIPTION OF THE DRAWINGS

The above and other features of the invention will now be particularly described with reference to the accompanying drawings.

FIG. 1 is an exploded partial cross-sectional view of a trailer ball mounting assembly in accordance with the invention;

FIG. 2 is a partial cross-sectional view of a trailer ball, nut and collar before the nut is tightened in accordance with the invention;

FIG. 3 is a partial cross-sectional view showing the trailer ball nut and collar as the nut is being tightened; and FIG. 4 is a perspective view of the mounting assembly after the nut is tightened.

DETAILED DESCRIPTION OF THE PREFERRED EMBODIMENT

In accordance with the invention, a trailer ball mounting assembly 10 for fastening a trailer ball 12 to a ball mounting platform 19 of any type of hitch (not shown) is shown in FIG. 1. The trailer ball mounting assembly 10 includes a flat washer 15, a clampload indicating nut 16, and a cotter pin 18. The trailer ball 12 is any conventional type having a threaded stem 14 for insertion into a bore 34 of the mounting platform 19. The stem 14 includes a diametrical bore 17 extending adjacent a free end for receiving the cotter pin 18.

As shown in FIG. 2, the washer 15 is a flat washer having a center hole for insertion on the stem 14.

As shown in FIGS. 1 and 4, the clampload indicating nut 16 includes a nut portion 20 and a plastic collar 22. The nut portion 20 has an outer hexagonal profile and a threaded bore 36. An angled counter bore 32 extends from the bore 36 to a flat annular surface 28. The plastic collar 22 has a ring 24 extending radially downwardly from a flange 26 having a frusto-conical outer surface 38 complementary with the counter bore 32. The flange has an aperture 30 formed to freely receive the stem 14. The ring 24 has an outer diameter slightly greater than the annular surface 28 of the nut 16.

Clampload nuts of this type are known. However, it is advantageous to form the collar 22 from a high density polyethylene resin such as DOW HDPE 25455N, manufactured by Dow Chemical Co. The ring has an axial thickness of 0.040 inch. It has been found advantageous to use a lubricant on the threads of the stem 14 and nut to control the tension and torque applied to the assembly. A suitable fluid is known as MACuGuard™, distributed by MacDermid, Inc. of Waterbury, Conn.

Next, the stem 14 of the trailer ball is positioned through the bore 34 of the mounting platform, the washer 15 is slid onto the stem to abut the platform 19. The nut 16 is threaded onto the stem 14 with the ring 24 disposed between the washer 15 and the annular flat surface 28 of the nut. The nut 16 then is tightened further as shown in FIGS. 3 and 4 until the plastic ring 24 is extruded outwardly from between the nut 16 and washer 15 to form an extrusion 30 which can be easily torn off. In this way a real-time tension based system is generated which indicates sufficient clamping load has been applied to the nut to satisfactorily tighten the trailer ball onto the mounting platform. After the trailer ball joint has been established the cotter pin 18 is inserted through the bore 17 at the end of the trailer ball stem 14.

As will be seen from the foregoing description, the apparatus and method of mounting provide a mounting assembly for a trailer ball which ensures that sufficient tension has been placed on the nut to avoid inadvertent unthreading of the nut.

I claim:

1. A trailer a ball fastening assembly for attaching a trailer ball with a threaded stem to a mounting platform, said fastening apparatus comprising:

a washer positioned on said stem abutting said mounting platform;

a nut mounted to said stem, said nut having an annular surface and an annular groove extending inwardly from said annular surface;

a plastic collar mounted on said stem, said collar having an annular ring positioned between said washer and said annular surface, said ring having an annular flange, said flange adapted to be received in said groove of said nut, said ring forming an extruded portion extending outwardly from said washer and said annular surface when said nut is tightened on said stem.

2. The trailer ball assembly of claim 1, wherein said trailer ball further comprises a diametrical bore for receiving a cotter pin.

3. The trailer ball assembly of claim 1, wherein said collar is formed of high density polyethylene resin.

4. A method of assembling a trailer ball to a mounting platform including the steps of:

inserting a stem of a trailer ball through a bore in a mounting platform;

abutting a washer receiving said stem against said mounting platform;

threading a nut having a collar on said stem, said collar having a ring disposed between an annular surface of said nut and said washer;

positioning a flange of said collar in an annular bore of said nut to maintain said collar in axial alignment;

tightening said nut until said ring portion of said collar is extruded outwardly between said nut and said washer;

removing said extruded ring from said collar.

5. The method of assembly of claim 4, further comprising a step of lubricating said stem before said threading step.

6. The method of assembly of claim 4, further comprising the step of inserting a cotter pin in said stem after said removing step.

\* \* \* \* \*